United States Patent
Thyagarajan et al.

(10) Patent No.: US 12,396,033 B2
(45) Date of Patent: Aug. 19, 2025

(54) DOWNLINK CONTROL CHANNEL MONITORING SWITCHING FOR UNLICENSED SPECTRUM

(71) Applicant: QUALCOMM Incorporated, San Diego, CA (US)

(72) Inventors: Ananta Narayanan Thyagarajan, Bangalore (IN); Pravjyot Singh Deogun, Bengaluru (IN); Kapil Bhattad, Bangalore (IN); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 17/755,218

(22) PCT Filed: Nov. 4, 2020

(86) PCT No.: PCT/US2020/058929
§ 371 (c)(1),
(2) Date: Apr. 22, 2022

(87) PCT Pub. No.: WO2021/092046
PCT Pub. Date: May 14, 2021

(65) Prior Publication Data
US 2022/0386373 A1 Dec. 1, 2022

(30) Foreign Application Priority Data
Nov. 8, 2019 (IN) .............. 201941045580

(51) Int. Cl.
H04W 74/00 (2009.01)
H04W 24/08 (2009.01)
H04W 74/0816 (2024.01)

(52) U.S. Cl.
CPC ....... *H04W 74/0816* (2013.01); *H04W 24/08* (2013.01); *H04W 74/006* (2013.01)

(58) Field of Classification Search
CPC ............. H04W 74/0816; H04W 24/08; H04W 74/006; H04W 72/23; H04W 76/27;
(Continued)

(56) References Cited

U.S. PATENT DOCUMENTS

2016/0095133 A1 3/2016 Hwang et al.
2017/0289907 A1 10/2017 Ang et al.
(Continued)

FOREIGN PATENT DOCUMENTS

| CN | 109818723 A | 5/2019 |
| WO | 2016046611 A2 | 3/2016 |
| WO | 2020145748 A1 | 7/2020 |

OTHER PUBLICATIONS

Ericsson (DL signals and channels for Nr-U, R1-1910945, Aug. 2019).*
(Continued)

*Primary Examiner* — Lakeram Jangbahadur
(74) *Attorney, Agent, or Firm* — Patterson + Sheridan LLP

(57) ABSTRACT

Certain aspects of the present disclosure provide improved techniques for monitoring a downlink control channel. For example, a method includes switching, at a first time period, to monitoring a downlink control channel according to a second group of search space sets in an unlicensed spectrum. The method further includes switching, after the first time period, to monitoring the downlink control channel according to a first group of search space sets in the unlicensed spectrum based on at least one of: i) expiration of a timer started based on the switching to monitoring the downlink control channel according to the second group of search
(Continued)

space sets; or (ii) end of a channel occupancy time (COT), of a serving cell, during which the UE monitors the downlink control channel according to the second group of search space sets.

30 Claims, 9 Drawing Sheets

(58) Field of Classification Search
CPC . H04L 27/0006; H04L 5/0023; H04L 5/0053; H04L 5/0096
See application file for complete search history.

(56) References Cited

U.S. PATENT DOCUMENTS

| 2017/0347394 | A1 | 11/2017 | Yasukawa et al. | |
|---|---|---|---|---|
| 2020/0351682 | A1* | 11/2020 | Cirik | H04W 76/28 |
| 2020/0351847 | A1* | 11/2020 | Kim | H04W 72/0446 |
| 2022/0141805 | A1* | 5/2022 | Tooher | H04L 5/0091 370/336 |

OTHER PUBLICATIONS

Qualcomm (Summary of RRC parameters for NR-U up to RAN1, R1-1911722, Nov. 2019).*
Oppo (Ue Adaptation to the Traffic and UE Power Consumption, R1-1902745, Mar. 2019).*
Ericsson: "DL Signals and Channels for NR-U", 3GPP Draft, 3GPP TSG-RAN WG1 Meeting #98bis, R1-1910945, Oct. 8, 2019 (Oct. 8, 2019), XP051809243, 24 Pages, Retrieved from the Internet: URL: https://ftp.3gpp.org/tsg_ran/WG1_RL1/TSGR1_98b/Docs/R1-1910945.zip. R1-1910945 DL Signals and Channels for NR-U.docx [retrieved on Oct. 8, 2019] section 3, figure 1 p. 7, "Option B (Search space switching)".
International Search Report and Written Opinion—PCT/US2020/058929—ISA/EPO—Feb. 18, 2021.
Oppo: "UE Adaptation to the Traffic and UE Power Consumption", 3GPP Draft, R1-1902745, 3GPP TSG RAN WG1 #96, 3rd Generation Partnership Project (3GPP), Mobile Competence Centre, 650, Route Des Lucioles, F-06921, Sophia-Antipolis Cedex, France, vol. Ran WG1, no. Athens, Greece, Feb. 25, 2019-Mar. 1, 2019, Feb. 16, 2019 (Feb. 16, 2019), XP051600440, 14 Pages.
Qualcomm Incorporated: "Summary of RRC Parameters for NR-U up to RAN1", 3GPP Draft, 3GPP TSG RAN WG1 Meeting #99, R1-1911722, 3rd Generation Partnership Project (3GPP), Mobile Competence Centre, 650, Route Des Lucioles, F-06921 Sophia-Antipolis Cedex, France, vol. Ran WG1, No. Reno, USA, Nov. 18, 2019-Nov. 22, 2019, Oct. 31, 2019 (Oct. 31, 2019), XP051814841, 10 Pages.
Qualcomm Incorporated: "Summary of NR-U Agreements till RAN1 #98", 3GPP TSG RAN WG1 Meeting #99, 3GPP Draft; R1-1911721, 3rd Generation Partnership Project (3GPP), Mobile Competence Centre, 650, Route Des Lucioles, F-06921 Sophia-Antipolis Cedex, France, vol. Ran WG1, No. Reno, USA; Nov. 18, 2019-Nov. 22, 2019, Oct. 29, 2019 (Oct. 29, 2019), 26 Pages.
ZTE: "Considerations on DL Reference Signals and Channels Design for NR-U", 3GPP Draft, 3GPP TSG RAN WG1 Meeting #95, R1-1812433, Considerations on DL reference Signals and Channels Design for NR-U Final, 3rd Generation Partnership Project (3GPP), Mobile Competence Centre, 650, Route Des Lucioles, F-06921, Sophia-Antipolis Cedex, France, vol. Ran WG1, No. Spokane, USA; Nov. 12, 2018-Nov. 16, 2018, Nov. 11, 2018 (Nov. 11, 2018), XP051554348, 8 pages.
Ericsson: "DL Signals and Channels for NR-U", 3GPP TSG-RAN WG1 Meeting #98bis, R1-1910945, Chongqing, China, Aug. 14-20, 2019, pp. 1-25, Section 3-4 and 6.
Oppo: "UE Adaptation to the Traffic and UE Power Consumption", 3GPP TSG RAN WG1 #96, R1-1902745, Athens, Greece, Feb. 25-Mar. 1, 2019, 14 Pages, Section 2.1.2.1.
Taiwan Search Report—TW109138693—TIPO—Jun. 21, 2024.

* cited by examiner

DOWNLINK CONTROL CHANNEL MONITORING SWITCHING FOR UNLICENSED SPECTRUM

CROSS-REFERENCE TO RELATED APPLICATION(S)

This application claims benefit of and priority to Indian Patent Application No. 201941045580, filed Nov. 8, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for monitoring a downlink control channel in an unlicensed spectrum.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for monitoring a downlink control channel, such as for communication in an unlicensed spectrum (e.g., in New Radio-based access to unlicensed spectrum (NR-U)) that provide power savings at the UE monitoring the downlink control channel.

Certain aspects of the present disclosure provide a method for wireless communication by a User Equipment (UE). The method generally includes monitoring a first group of search space sets in an unlicensed spectrum while attempting to detect a channel occupancy time (COT) period of a serving cell; detecting a trigger to switch to monitoring a second group of search space sets in the unlicensed spectrum; and in response to detecting the trigger, switching to monitor the second group of search space sets.

Certain aspects of the present disclosure provide a method for wireless communication by a Base Station (BS). The method generally includes configuring a plurality of groups of search space sets that can be monitored by a user equipment (UE) in an unlicensed spectrum, wherein the plurality of groups includes at least a first group of search space sets and a second group of search space sets, wherein the first group of search space sets as compared to the second group of search space sets has more occasions configured in a given time period for monitoring a control channel in the unlicensed spectrum; deciding when the UE is to monitor each of the plurality of groups of search space sets; and transmitting to the UE information relating to when the UE is to monitor each of the plurality of groups of search space sets, based on the decision.

Certain aspects of the present disclosure provide an apparatus for wireless communication by a User Equipment (UE). The apparatus generally includes at least one processor and a memory coupled to the at least one processor. The at least one processor is generally configured to monitor a first group of search space sets in an unlicensed spectrum while attempting to detect a channel occupancy time (COT) period of a serving cell; detect a trigger to switch to monitoring a second group of search space sets in the unlicensed spectrum; and in response to detecting the trigger, switch to monitor the second group of search space sets.

Certain aspects of the present disclosure provide an apparatus for wireless communication by a Base Station (BS). The apparatus generally includes at least one processor and a memory coupled to the at least one processor. The at least one processor is generally configured to configure a plurality of groups of search space sets that can be monitored by a user equipment (UE) in an unlicensed spectrum, wherein the plurality of groups includes at least a first group of search space sets and a second group of search space sets, wherein the first group of search space sets as compared to the second group of search space sets has more occasions configured in a given time period for monitoring a control channel in the unlicensed spectrum; decide when the UE is to monitor each of the plurality of groups of search space sets; and transmit to the UE information relating to when the UE is to monitor each of the plurality of groups of search space sets, based on the decision.

Certain aspects of the present disclosure provide a method of wireless communication by a user equipment (UE). The method includes switching, at a first time period, to monitoring a downlink control channel according to a second group of search space sets in an unlicensed spectrum. The method further includes switching, after the first time period, to monitoring the downlink control channel according to a first group of search space sets in the unlicensed spectrum based on at least one of: i) expiration of a timer started based on the switching to monitoring the downlink control channel according to the second group of search space sets; or (ii) end of a channel occupancy time (COT), of a serving cell, during which the UE monitors the downlink control channel according to the second group of search space sets.

Certain aspects of the present disclosure provide a method for wireless communication by a base station (BS). The method includes transmitting, to a user equipment (UE), a value for a timer for switching to monitoring a downlink control channel according to a first group of search space sets in an unlicensed spectrum based on expiration of the timer after switching to monitoring the downlink control channel according to a second group of search space sets in the unlicensed spectrum. The method further includes performing a listen-before-talk procedure to determine availability of the unlicensed spectrum. The method further includes transmitting downlink control information to the UE in the downlink control channel based on the determined availability of the unlicensed spectrum.

Certain aspects provide an apparatus or user equipment (UE). The apparatus includes at least one processor coupled to a memory. The at least one processor and the memory are configured to switch, at a first time period, to monitoring a downlink control channel according to a second group of search space sets in an unlicensed spectrum. The at least one processor and the memory are further configured to switch, after the first time period, to monitoring the downlink control channel according to a first group of search space sets in the unlicensed spectrum based on at least one of: i) expiration of a timer started based on the switching to monitoring the downlink control channel according to the second group of search space sets; or (ii) end of a channel occupancy time (COT), of a serving cell, during which the UE monitors the downlink control channel according to the second group of search space sets.

Certain aspects provide an apparatus or base station (BS). The apparatus includes at least one processor coupled to a memory. The at least one processor and the memory are configured to transmit, to a user equipment (UE), a value for a timer for switching to monitoring a downlink control channel according to a first group of search space sets in an unlicensed spectrum based on expiration of the timer after switching to monitoring the downlink control channel according to a second group of search space sets in the unlicensed spectrum. The at least one processor and the memory are further configured to perform a listen-before-talk procedure to determine availability of the unlicensed spectrum. The at least one processor and the memory are further configured to transmit downlink control information to the UE in the downlink control channel based on the determined availability of the unlicensed spectrum.

Certain aspects provide an apparatus or user equipment (UE). The apparatus includes means for switching, at a first time period, to monitoring a downlink control channel according to a second group of search space sets in an unlicensed spectrum. The apparatus further includes means for switching, after the first time period, to monitoring the downlink control channel according to a first group of search space sets in the unlicensed spectrum based on at least one of: i) expiration of a timer started based on the switching to monitoring the downlink control channel according to the second group of search space sets; or (ii) end of a channel occupancy time (COT), of a serving cell, during which the UE monitors the downlink control channel according to the second group of search space sets.

Certain aspects provide an apparatus or base station (BS). The apparatus includes means for transmitting, to a user equipment (UE), a value for a timer for switching to monitoring a downlink control channel according to a first group of search space sets in an unlicensed spectrum based on expiration of the timer after switching to monitoring the downlink control channel according to a second group of search space sets in the unlicensed spectrum. The apparatus further includes means for performing a listen-before-talk procedure to determine availability of the unlicensed spectrum. The apparatus further includes means for transmitting downlink control information to the UE in the downlink control channel based on the determined availability of the unlicensed spectrum.

Certain aspects provide a non-transitory computer readable medium including instructions that when executed by an apparatus or user equipment (UE), cause the apparatus or UE to perform a method for wireless communication. The method includes switching, at a first time period, to monitoring a downlink control channel according to a second group of search space sets in an unlicensed spectrum. The method further includes switching, after the first time period, to monitoring the downlink control channel according to a first group of search space sets in the unlicensed spectrum based on at least one of: i) expiration of a timer started based on the switching to monitoring the downlink control channel according to the second group of search space sets; or (ii) end of a channel occupancy time (COT), of a serving cell, during which the UE monitors the downlink control channel according to the second group of search space sets.

Certain aspects provide a non-transitory computer readable medium including instructions that when executed by an apparatus or base station (BS), cause the apparatus or BS to perform a method for wireless communication. The method includes transmitting, to a user equipment (UE), a value for a timer for switching to monitoring a downlink control channel according to a first group of search space sets in an unlicensed spectrum based on expiration of the timer after switching to monitoring the downlink control channel according to a second group of search space sets in the unlicensed spectrum. The method further includes performing a listen-before-talk procedure to determine availability of the unlicensed spectrum. The method further includes transmitting downlink control information to the UE in the downlink control channel based on the determined availability of the unlicensed spectrum.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
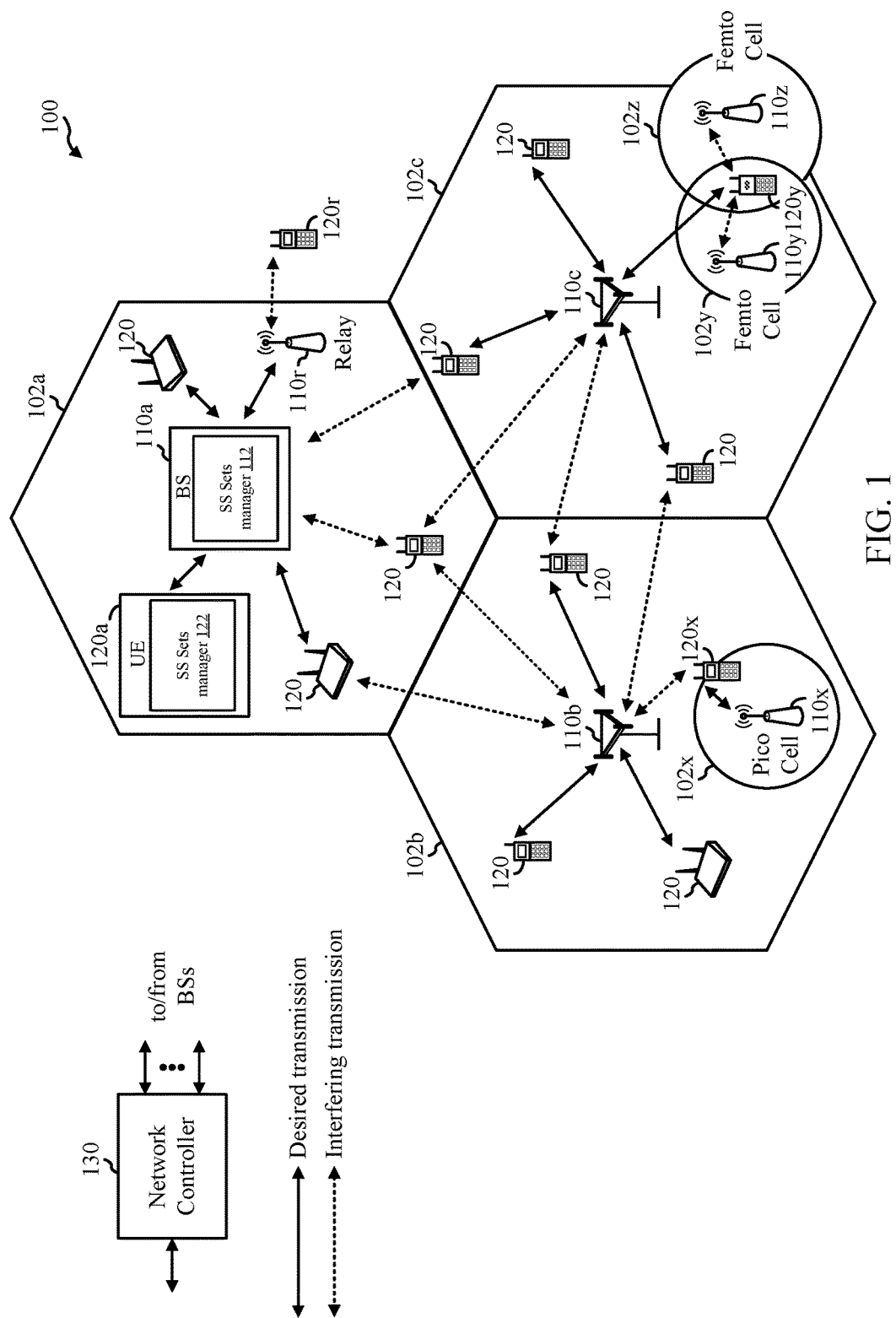
FIG. 1 is a block diagram conceptually illustrating an example telecommunications system, in accordance with certain aspects of the present disclosure.

Certain aspects herein provide systems, methods, apparatuses, and/or computer-readable mediums that provide techniques for a UE to switch between using particular groups of search space sets (e.g., corresponding to different time resources) for monitoring a downlink control channel (e.g., physical downlink control channel (PDCCH)) in an unlicensed spectrum, such as in NR-U communications. Certain aspects provide how the switches between search space sets are triggered or configured (e.g., what signaling will trigger and/or configure the switches between groups of search space sets).

In certain aspects, in unlicensed spectrum communications, such as in NR-U, an acquiring device, such as a BS, needs to acquire use of a frequency band before it can transmit on the frequency band. For example, the BS needs to acquire use of a frequency band corresponding to a downlink control channel to transmit a downlink transmission including downlink control information (DCI) on the downlink control channel, such as to a UE. The BS may acquire use of the frequency band by performing a listen before talk (LBT) procedure where the BS measures for signals on the frequency band prior to utilizing the frequency band for communication. If, during the LBT procedure, the BS determines that the frequency band is free (e.g., the measured signal strength is below a threshold for a certain time period), the BS may acquire use of the frequency band for a channel occupancy time (COT). The BS may acquire use of the frequency band for the COT by itself transmitting (e.g., downlink control information) and/or allocating other devices (e.g., a UE) to transmit on one or more subchannels of the frequency band for the duration of the COT.

In certain aspects, a UE monitors the downlink control channel for downlink transmissions from the BS. Since the BS needs to acquire the use of the frequency band before it can transmit the downlink transmissions, the time at which the downlink transmissions will actually occur may vary based on availability of the frequency band. In order to compensate for this, more possible occasions (e.g., time periods, which may be referred to as downlink transmission start points) may be defined (e.g., as compared to in a licensed spectrum communication) for attempted LBT and transmission by the BS on the downlink control channel. However, this may mean that the UE may need to monitor the downlink control channel more frequently, corresponding to the additional occasions, which can lead to increased power usage at the UE for monitoring the downlink control channel.

In certain aspects, the UE is configured with a plurality of search space sets (e.g., corresponding to different time resources (e.g., that occur periodically)), and the UE at any given time may be configured to monitor the downlink control channel during the time resources corresponding to one or more of the search space sets. Further, the UE may be configured to switch between different one or more search space sets to use for monitoring the downlink control channel, such as according to the techniques discussed herein.

Certain aspects of the present disclosure provide techniques for triggering and/or configuring switches between groups of search space sets in the context of monitoring a downlink control channel (e.g., PDCCH) in an unlicensed spectrum (e.g., NR-U). Though certain aspects are discussed with respect to PDCCH and NR-U, they may be equally applicable to communication channels for other (e.g., unlicensed spectrum) communication. The discussed techniques for switching between groups of search space sets, in certain aspects, provide an appropriate tradeoff between the BS being able to transmit a PDCCH grant quickly after acquiring the unlicensed carrier and the UE not spending too much power to monitor PDCCH.

The following description provides examples of switching between groups of search space sets for UE power savings, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for monitoring groups of search space (SS) sets in accordance with aspects of the present disclosure. As shown in FIG. 1, the BS 110a includes a SS sets manager 112. The SS sets manager 112 may be configured for configuring a plurality of groups of search space sets that can be monitored by a user equipment (UE) in an unlicensed spectrum, wherein the plurality of groups includes at least a first group of search space sets and a second group of search space sets, wherein the first group of search space sets as compared to the second group of search space sets has more occasions configured in a given time period for monitoring a control channel in the unlicensed spectrum; deciding when the UE is to monitor each of the plurality of groups of search space sets; and transmitting to the UE information relating to when the UE is to monitor each of the plurality of groups of search space sets, based on the decision, in accordance with aspects of the present disclosure described herein. In certain aspects, the SS sets manager 112 may be configured to transmit, to a user equipment (UE), a value for a timer for switching to monitoring a downlink control channel according to a first group of search space sets in an unlicensed spectrum based on expiration of the timer after switching to monitoring the downlink control channel according to a second group of search space sets in the unlicensed spectrum; perform a listen-before-talk procedure to determine availability of the unlicensed spectrum; and transmit downlink control information to the UE in the downlink control channel based on the determined availability of the unlicensed spectrum. In certain aspects, the SS sets manager 112 comprises various means for transmitting, means for performing, and means for transmitting for performing the recited functions. In certain aspects, each of the means for transmitting, means for performing, and means for transmitting comprises one or more of suitable memory, a processor, DSP, integrated circuit, code, antenna, modem, etc.

As shown in FIG. 1, the UE 120a includes a SS sets manager 122. The SS sets manager 122 may be configured for monitoring a first group of search space sets in an unlicensed spectrum while attempting to detect a channel occupancy time (COT) period of a serving cell; detecting a trigger to switch to monitoring a second group of search space sets in the unlicensed spectrum; and in response to detecting the trigger, switching to monitor the second group of search space sets, in accordance with aspects of the present disclosure described herein. In certain aspects, the SS sets manager 122 may be configured to switch, at a first time period, to monitoring a downlink control channel according to a second group of search space sets in an unlicensed spectrum; and switch, after the first time period, to monitoring the downlink control channel according to a first group of search space sets in the unlicensed spectrum based on at least one of: i) expiration of a timer started based on the switching to monitoring the downlink control channel according to the second group of search space sets; or (ii) end of a channel occupancy time (COT), of a serving cell, during which the UE monitors the downlink control channel according to the second group of search space sets. In certain aspects, the SS sets manager 122 comprises various means for switching to perform the recited functions. In certain aspects, the means for switching comprises one or more of suitable memory, a processor, DSP, integrated circuit, code, antenna, modem, etc.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
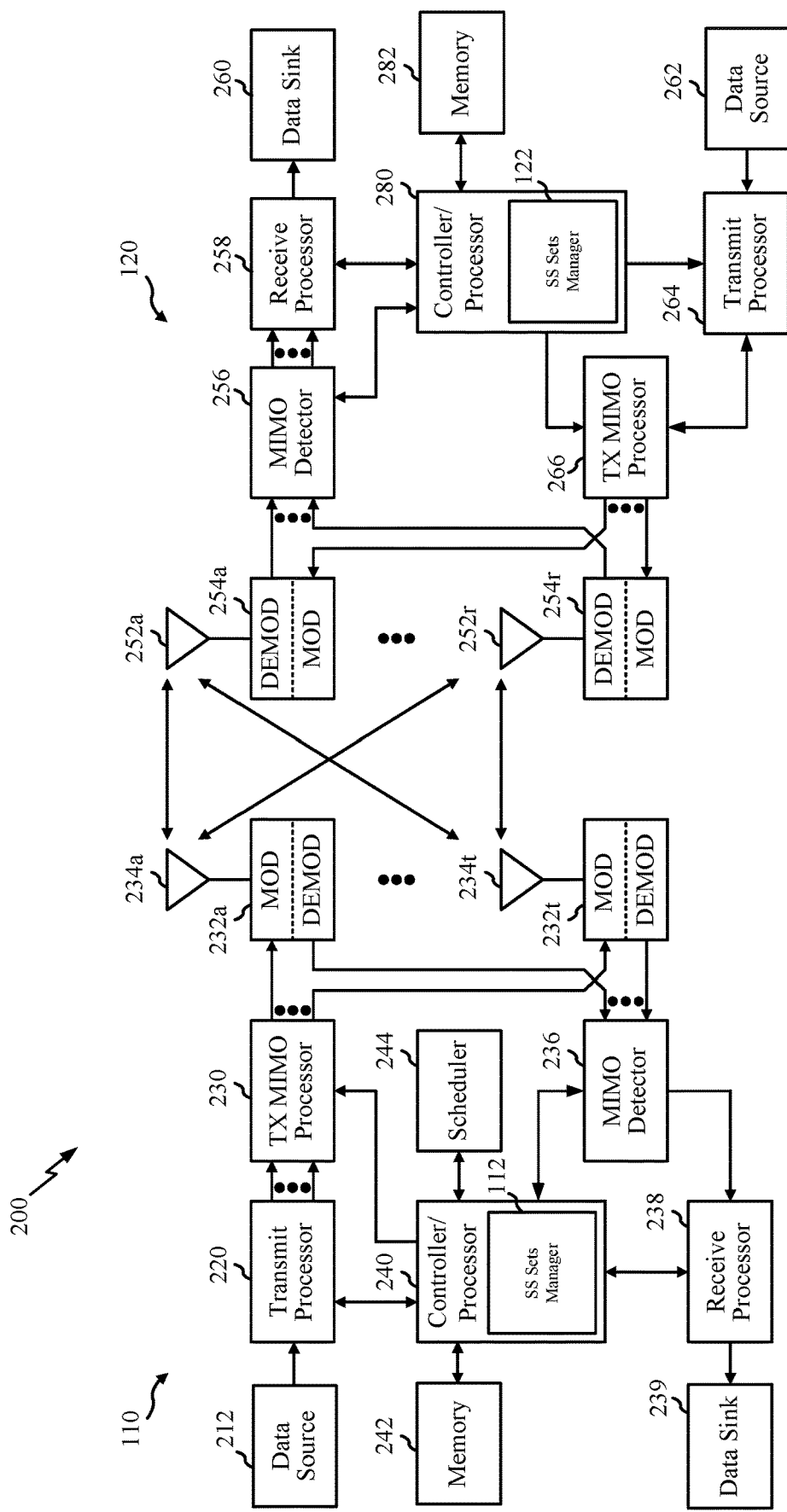
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc.

The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110 has the SS sets manager 112.

As shown in FIG. 2, the controller/processor 280 of the UE 120 has the SS sets manager 122.

Although shown at the Controller/Processor, other components of the UE 120a and BS 110a may be used performing the operations described herein.

Example Monitoring of Downlink Control Channel For UE Power Savings

In certain cases, NR may operate in unlicensed bands through NR-based access to unlicensed spectrum (NR-U). In certain aspects, NR-U can extend the applicability of NR to unlicensed spectrum bands as a general purpose technology that works across different bands and uses a design that allows fair coexistence across different RATs.

In certain aspects, to enable worldwide regulation-compliant access and satisfy a fair coexistence with the unlicensed systems (e.g., Wi-Fi, WiGig, radar etc.) and intra-RAT services, any technology that attempts to access the unlicensed spectrum (like NR-U) may be required to fulfill certain regulatory requirements. In certain aspects, a device may be required to perform a Listen-Before-Talk (LBT) procedure in order to obtain access to a channel in an unlicensed spectrum. In certain aspects, the LBT procedure is a mechanism by which a device applies a Clear Channel Assessment (CCA) check (e.g., spectrum sensing for a certain period, called the CCA period) before using the channel and which imposes certain rules after determining the channel to be busy. CCA uses Energy Detection (ED) to detect the presence (i.e., channel is busy) or absence (i.e., channel is idle) of other signals on the channel. If the detected energy during an initial CCA period is lower than a certain threshold (the ED threshold), the device can access the channel for a period called Channel Occupancy Time (COT). Otherwise, an extended CCA period starts, in which the detected energy is again compared against the ED threshold until channel access is granted. In some cases, limits may be imposed on the COT, i.e., the maximum continuous time a device can use the channel once acquired, commonly referred to as Maximum Channel Occupancy Time (MCOT). The MCOT generally indicates the maximum amount of time a device can acquire the unlicensed channel for a particular channel access priority class. It may be noted that COT duration is always less than or equal to MCOT duration for a channel access priority class.

In certain aspects, a BS may be required to perform the LBT procedure to acquire a channel in the unlicensed spectrum and before performing DL transmissions on the channel. In order to avoid transmission gaps after a successful acquisition of a channel based on LBT procedure, in certain aspects, a higher number of DL transmission occasions may be supported for the unlicensed spectrum (e.g., as compared to the licensed spectrum). In certain aspects, this enables the BS to transmit downlink control information (DCI) on a PDCCH quickly after successful channel acquisition based on the LBT procedure. However, this may work only when a UE served by the BS monitors PDCCH occasions more frequently in an attempt to receive PDCCH data from the BS. For example, the UE may be required to monitor the higher number of PDCCH occasions configured.

However, monitoring PDCCH occasions more frequently may come at a significant power consumption cost. One of the primary goals for NR-U is energy efficiency. Thus, there is motivation to reduce UE power consumption, such as in NR-U, while still enabling the BS to transmit DCI quickly after successfully acquiring a channel based on LBT procedure. In certain aspects, there needs to be a trade-off between providing more granular PDCCH transmission occasions so that the BS is able to transmit quickly after acquiring the channel and the UE not spending too much power in order to monitor the occasions at the high granularity.

In certain aspects, once the BS successfully acquires an unlicensed channel and the UE receives a PDCCH grant from the BS, the UE is not expected to receive frequent PDCCH transmissions when operating within the COT period. Thus, one technique for achieving this tradeoff efficiently may include configuring the UE to monitor PDCCH occasions more frequently when operating outside the COT period (e.g., when the BS is attempting to acquire an unlicensed channel using LBT), and then relaxing the monitoring requirement after the UE receives a PDCCH grant within the COT period, for example, after the channel has been acquired and at least for the remaining duration of the current COT period. This may be an effective strategy as the UE monitoring the PDCCH occasions more frequently outside the COT period ensures that the UE does not miss a PDCCH transmission, and at the same time ensures that, once the channel is acquired and the UE receives a PDCCH grant, the UE does not waste power to monitor PDCCH occasions more frequently. In certain aspects, this strategy assumes that the UE is not expected to receive frequent PDCCH transmissions when operating within the COT period.

In certain aspects, certain definitions in NR standards may be leveraged in order to implement the above technique. For example, in certain aspects (e.g., such as agreed to in NR) a UE can be configured with at least two groups of search space sets for the PDCCH and that the UE can switch between the configured groups of search space sets. A search space set generally defines a range of time and frequency resources where PDCCH may be transmitted by the BS. A UE generally performs blind decoding throughout the search space set in an attempt to detect and decode a PDCCH transmission from the BS. In certain aspects, a group of search space sets may include one or more search space sets.

In certain aspects, different search space sets may be defined with different granularities for PDCCH occasions. For example, a first search space set may be defined with a higher granularity, for example, a mini-slot level granularity for PDCCH occasions where there may be multiple PDCCH occasions configured in a single slot. A second search space set may be defined with a lower granularity, for example, a slot level granularity where there is a single PDCCH occasion configured in each slot. Thus, the first search space set as compared to the second search space set has a higher frequency of PDCCH occasions in a given time interval. In certain aspects, the UE may be configured to monitor one or more search space sets having a higher frequency of PDCCH occasions in a given time interval when operating outside the COT period (e.g., when attempting to acquire an unlicensed channel). The UE may be configured to switch to one or more search space sets having a lower frequency of PDCCH occasions in the given time interval after receiving a PDCCH grant (e.g., after successfully acquiring the channel and after entering the COT period) for at least a portion of the remaining COT period. It should be noted that though certain aspects are described with respect to a slot as a time duration, and a mini-slot as a subset of such a slot time duration, other time durations and subsets of such time durations may similarly be used as defining a PDCCH occasion.

Figure 3:
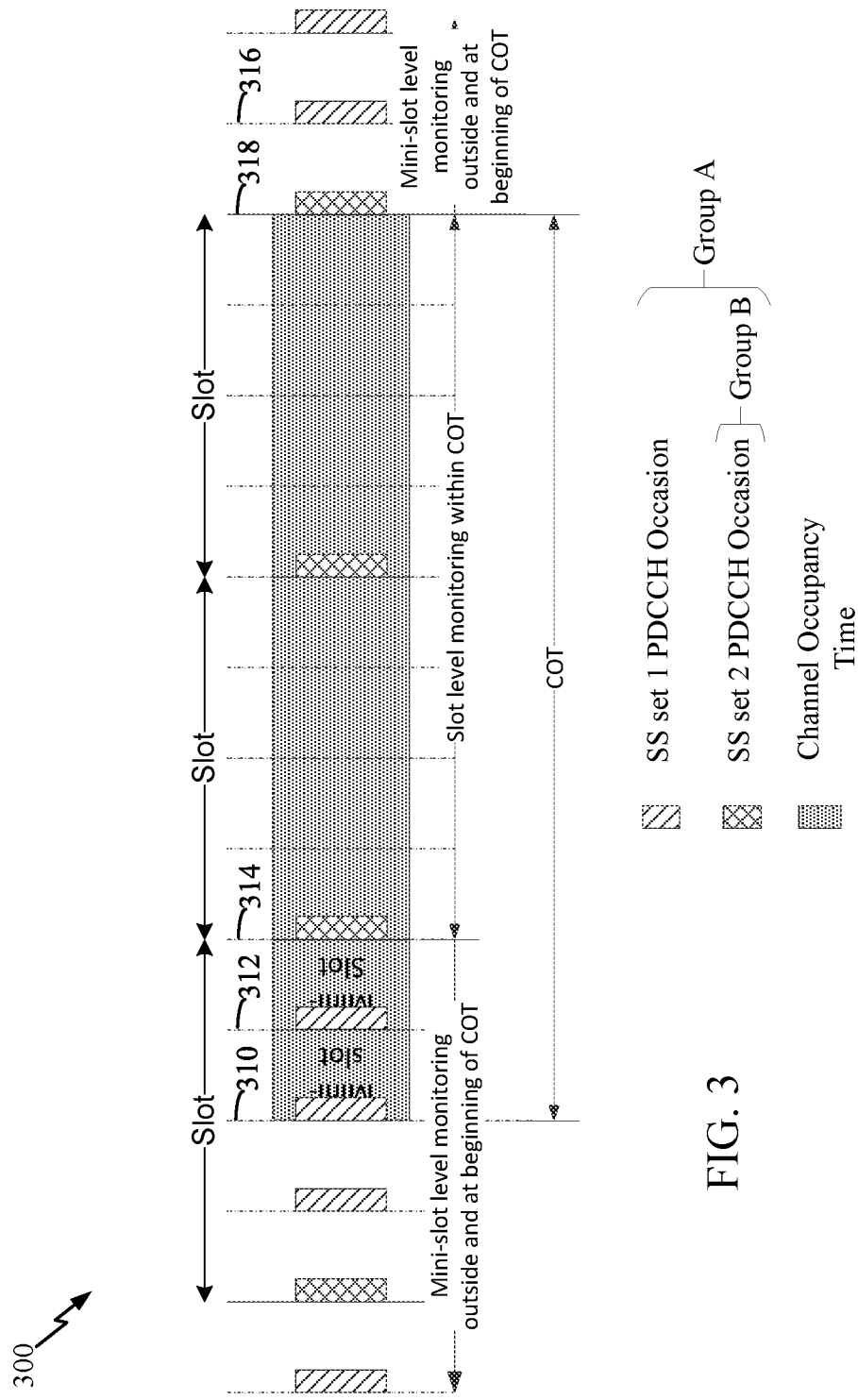
FIG. 3 illustrates an example transmission timeline for communication (e.g., in NR-U), in accordance with certain aspects of the present disclosure.

FIG. 3 illustrates an example transmission timeline 300 for communication (e.g., in NR-U), in accordance with certain aspects of the present disclosure.

The example of FIG. 3 assumes that the UE is configured with two groups of search space sets namely group A and group B. Group A is configured to include two search space sets SS set 1 and SS set 2, while group B is configured to include SS set 2. Thus, SS set 2 is common between groups A and B. SS set 1 is configured with a mini-slot level granularity for PDCCH occasions and SS set 2 is configured with a slot level granularity. As shown in FIG. 3 each slot includes four mini-slots. However, it may be noted that a slot may include less or more than four mini-slots. As shown, SS set 1 includes a PDCCH occasion in each mini-slot slot and SS set 2 includes a single PDCCH location in each slot. Thus, SS set 1 includes PDCCH occasions at a mini-slot level granularity and SS set 2 includes PDCCH occasions at a slot level granularity. While each PDCCH occasion as shown in FIG. 3 is at the start of each mini-slot or slot, it may be noted that a PDCCH occasion may be configured at any symbol within a mini-slot or slot.

In certain aspects, the UE may be configured to monitor group A SS sets when operating outside the COT period, for example, when the BS is attempting to acquire an unlicensed spectrum using the LBT procedure. This means the UE must monitor both SS set 1 and SS set 2 when outside the COT period. As shown in FIG. 3 the UE monitors PDCCH occasions corresponding to SS set 1 and SS set 2 when operating outside the COT period. By monitoring the PDCCH occasions at a higher granularity (e.g., mini-slot level granularity) outside the COT period, the UE ensures that it does not miss a PDCCH transmitting right after the BS acquires an unlicensed carrier. In certain aspects, when the BS acquires an unlicensed carrier it may enter a COT period where it may use the carrier for downlink/uplink communication with the UE for the duration of the COT period. As shown in FIG. 3, the BS enters the COT period at mini-slot boundary 310. In certain aspects, in order to save power, once the UE receives a PDCCH grant after entering the COT period, the UE may monitor for the PDCCH at relatively relaxed frequency as compared to the frequency of PDCCH monitoring when operating outside the COT period. As shown in FIG. 3 the UE switches to monitoring Group B SS set 2 only at a slot level granularity starting at slot boundary 314 after entering the COT period. For example, after entering the COT period at mini-slot boundary 310, the UE may receive a PDCCH grant at PDCCH occasion 312 and may switch to monitoring Group B SS set 2 only starting from slot boundary 314. In certain aspects, the UE may continue monitoring Group B SS set 2 for a portion of the remaining COT period or for the entire remaining duration of the COT period. As shown in FIG. 3, the UE continues monitoring Group B SS set 2 for the entire remaining duration of the COT period. In certain aspects, the UE may switch back to monitoring PDCCH occasions corresponding to Group A SS sets at a higher frequency after expiration of the COT period when the BS no more has access to the carrier. As shown in FIG. 3, the UE switches to monitoring Group A SS sets at mini-slot boundary 316.

The above discussion shows that a UE monitoring PDCCH occasions at a higher frequency when operating outside COT period and switching to monitoring PDCCH occasions at a lower frequency within the COT period provides an appropriate tradeoff between the BS being able to transmit a PDCCH grant quickly after acquiring the unlicensed carrier and the UE not spending too much power to monitor PDCCH. By switching to monitoring PDCCH occasions at a lower frequency for at least a portion of the COT period, the UE can achieve significant power savings.

Further, certain aspects provide techniques regarding when the UE is to switch between particular groups of search space sets in the context of PDCCH monitoring, such as for NR-U, and further how the switches will be triggered or configured (e.g., what signaling will trigger and/or configure the switches between groups of search space sets).

Certain aspects of the present disclosure provide techniques for triggering and/or configuring switches between groups of search space sets in the context of monitoring PDCCH, such as in NR-U. The discussed techniques for switching between groups of search space sets provide an appropriate tradeoff between the BS being able to transmit a PDCCH grant quickly after acquiring the unlicensed carrier and the UE not spending too much power to monitor PDCCH.

Figure 4:
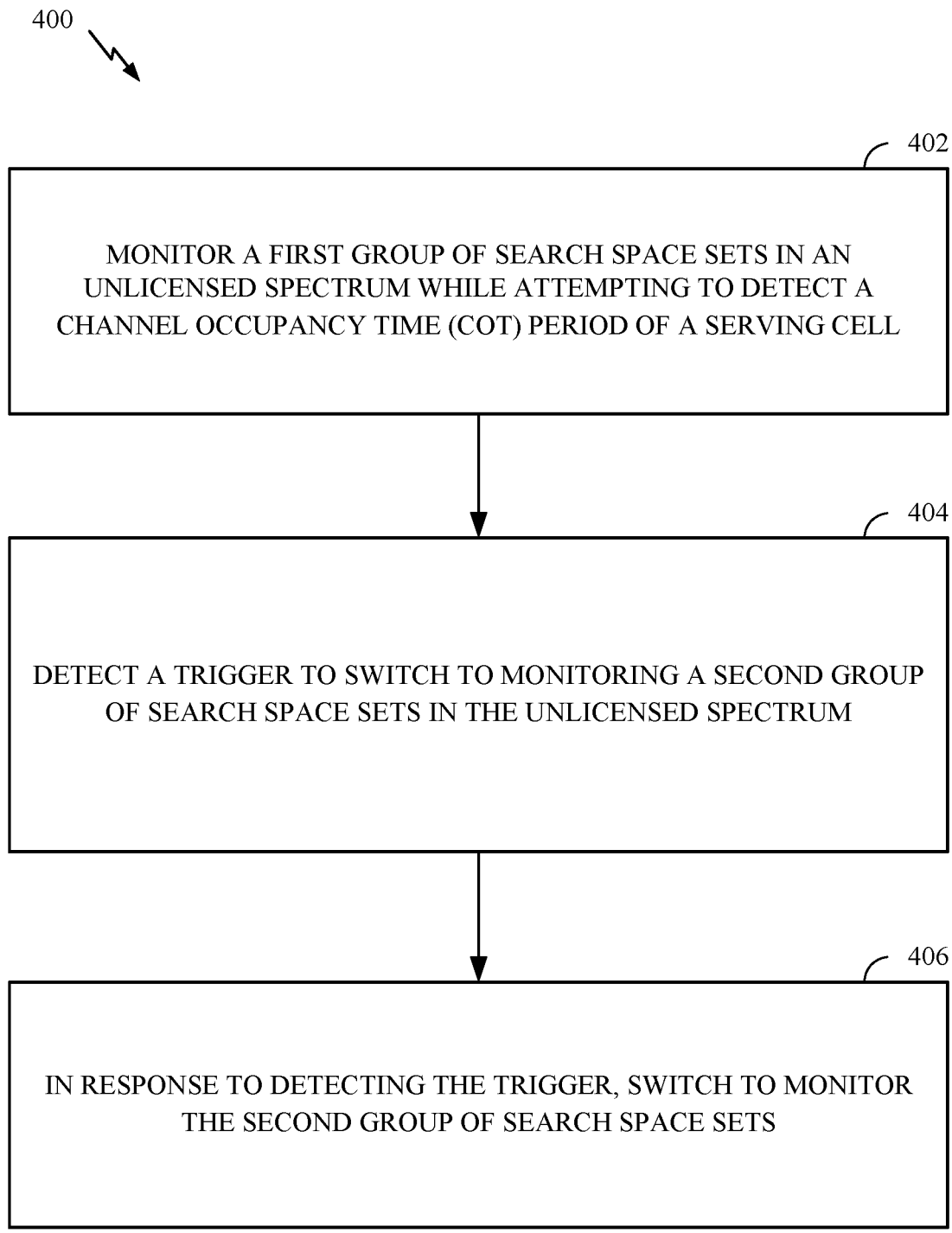
FIG. 4 illustrates example operations performed by a UE for switching between monitoring groups of search space sets, in accordance with certain aspects of the present disclosure.

FIG. 4 illustrates example operations 400 performed by a UE for switching between monitoring groups of search space sets, in accordance with certain aspects of the present disclosure.

Operations 400 begin, at 402, by monitoring a first group of search space sets in an unlicensed spectrum while attempting to detect a channel occupancy time (COT) period of a serving cell.

At 404, the UE detects a trigger to switch to monitoring a second group of search space sets in the unlicensed spectrum.

Figure 5:
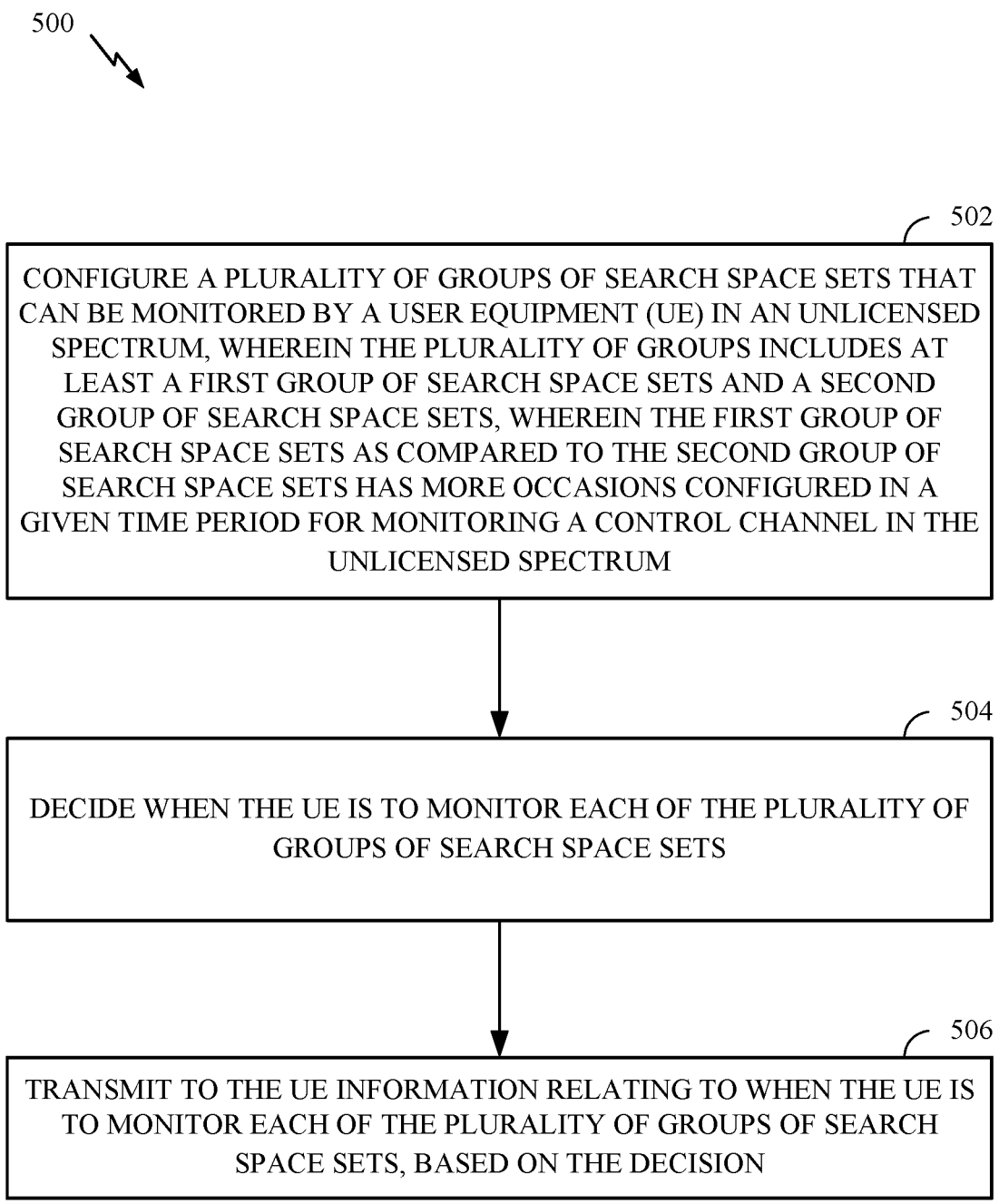
FIG. 5 illustrates example operations performed by a BS (e.g., gNB) for triggering a UE to switch between monitoring groups of search space sets, in accordance with certain aspects of the present disclosure.

At 406, the UE, in response to detecting the trigger, switches to monitor the second group of search space sets FIG. 5 illustrates example operations 500 performed by a BS (e.g., gNB) for triggering a UE to switch between monitoring groups of search space sets, in accordance with certain aspects of the present disclosure.

Operations 500 begin, at 502, by configuring a plurality of groups of search space sets that can be monitored by a user equipment (UE) in an unlicensed spectrum, wherein the plurality of groups includes at least a first group of search space sets and a second group of search space sets, wherein the first group of search space sets as compared to the second group of search space sets has more occasions configured in a given time period for monitoring a control channel in the unlicensed spectrum.

At 504, the BS decides when the UE is to monitor each of the plurality of groups of search space sets.

At 506, the BS transmits to the UE information relating to when the UE is to monitor each of the plurality of groups of search space sets, based on the decision.

In certain aspects, explicit signaling may be used to trigger a switch between groups of search space sets at the UE. In certain aspects, the BS may include one or more explicit bits in a group-common PDCCH (GC-PDCCH) and/or UE-specific PDCCH, the one or more bits identifying the group of search space sets the UE is to switch to. While GC-PDCCH generally includes DCI common for multiple UEs, a UE-specific PDCCH is specific to a single UE.

In certain aspects, the number of bits in the DCI may be a function of the number of groups of search space sets configured for the UE, wherein each group of search space sets may be identified by a different unique bit pattern. For example, when the UE is configured with Groups A and B, one bit may be used to identify the two groups, a bit value '0' identifying Group A and a bit value '1' identifying Group B. In certain aspects, for N groups of SS sets are configured, log 2(N) bits may be used in the DCI to uniquely identify the configured groups.

Referring to the example of FIG. 3, after the BS acquires the unlicensed carrier and enters the COT period at 310, the BS may transmit a GC-PDCCH or UE-specific PDCCH at 312 indicating the UE to switch to monitoring Group B SS set 2. The UE may switch to Group B in response to the trigger and continue monitoring Group B till the UE detects another trigger to switch back to Group A (or another Group of SS sets). For example, the BS may transmit another GC-PDCCH or UE-specific PDCCH at the end of the COT period at 318 indicating the UE to switch back to monitoring Group A SS sets.

In certain aspects, the explicit signaling to switch between groups of SS sets provides the BS more control regarding when the UE switches between particular groups of SS sets, for example as compared to the UE configured to automatically switch between groups of SS sets based on some pre-defined criteria. In certain aspects, the BS may transmit the signaling to the UE based on downlink transmissions scheduled for the UE. For example, referring to the example of FIG. 3, the BS may not transmit signaling to the UE to switch from Group A to Group B until it has transmitted a PDCCH grant after entering the COT period and/or until the BS does not expect the UE to receive more PDCCH grants for a remaining duration of the COT period.

In certain aspects, the GC-PDCCH and/or UE-specific PDCCH may be configured to carry a COT duration field to indicate a remaining duration of the COT period (e.g., remaining number of slots/mini-slots) from the slot/mini-slot in which the GC-PDCCH or UE-specific PDCCH is transmitted to the UE. In certain aspects, the COT duration field may be used as a trigger for the UE to switch between groups of SS sets. In certain aspects, the UE may be pre-configured (e.g., via RRC signaling) to switch to a particular group of SS sets when it detects a COT duration field with a non-zero value and to switch to another particular group of SS sets when it detects the duration indicated by the COT duration field has expired. Referring to the example of FIG. 3, once the UE enters the COT period (while still monitoring Group A), the UE may receive a GC-PDCCH or a UE-specific PDCCH at 312 including a COT duration field. If the UE detects a non-zero value of the COT duration field which is greater than a threshold, the UE switches to monitoring Group B for the remaining duration of the COT period as indicated by the COT duration field. The UE may then switch back to monitoring Group A at the end of the indicated remaining COT duration. In some aspects, the value of the threshold is pre-determined (e.g. threshold=0). In other aspects, the value of the threshold can be configured by the BS. In some aspects, the value of the threshold can be based on the time it takes UE to switch between Group A and Group B PDCCH monitoring.

In certain aspects, a timer based mechanism may be used as a trigger for the UE to switch between groups of SS sets. In certain aspects, the timer based mechanism may be used when the UE is not configured with explicit signaling for switching between groups of SS sets as discussed above or has missed explicit signaling indicating the UE to switch between groups of SS sets.

In certain aspects, when a UE has been monitoring a group of SS sets having higher frequency of PDCCH occasions (e.g., PDCCH occasions with sub-slot level granularity) for a given time period without detecting a PDCCH grant or any other traffic, the UE may be configured/allowed to autonomously switch to monitoring another group of SS set having a lower frequency of PDCCH occasions (e.g., PDCCH occasions with slot level granularity). In certain aspects, a timer (e.g., T1) may be used to track the amount of time the UE has monitored the group of SS sets having higher frequency of PDCCH occasions after which the UE may be configure/allowed to switch to the group of SS sets having a lower frequency of PDCCH occasions. Referring the example of FIG. 3, the timer T1 may be started when the UE switches from monitoring Group B to monitoring Group A. When the UE detects that the timer T1 has expired (e.g., without the UE detecting a grant or other traffic), the UE switches to monitoring Group B at a lower slot level granularity of PDCCH occasions in order to save power. In certain aspects, the T1 timer may be a relaxed timer with the value of the T1 timer set to about 30 to 40 ms or higher.

In some cases, when monitoring a group of SS sets (e.g., when operating within the COT period) having a lower frequency of PDCCH occasions (e.g., PDCCH occasions with slot level granularity), the UE may miss an indication from the BS to switch to another group of SS sets having a higher frequency of PDCCH occasions (e.g., PDCCH occasions with sub-slot level granularity). This may result in the UE continuing to monitor PDCCH occasions with lower frequency (e.g., PDCCH occasions with slot level granularity) after the expiration of the COT period and missing a grant transmitted mid-slot by the BS. Referring to the example of FIG. 3, when the UE is monitoring Group B within the COT period the UE may miss a PDCCH grant at 318 transmitted at the end of the slot including an indication to switch back to Group A. Thus, the UE continues to monitor Group B at slot level granularity and misses the Group A PDCCH occasions configured before the next Group B PDCCH occasion in the next slot. If the BS transmits another PDCCH grant at 316, the UE misses it and does not know that another COT period has started.

In certain aspects, when the UE has been monitoring a group of SS sets (e.g., when operating within the COT period) having a lower frequency of PDCCH occasions (e.g., PDCCH occasions with slot level granularity) for a given time period without detecting a trigger to switch to another group of SS sets having a higher frequency of PDCCH occasions (e.g., PDCCH occasions with sub-slot level granularity), the UE may be configured/allowed to autonomously switch to the group of SS sets having the higher frequency of PDCCH occasions. In certain aspects, a timer (e.g., T2) may be used to track the amount of time the UE has monitored the group of SS sets having lower PDCCH frequency after which the UE is configured/allowed to switch to the group of SS sets having a higher frequency of PDCCH occasions. In certain aspects, the timer T2 may be started when the UE switches to the group of SS set having a lower frequency of PDCCH occasions. In certain aspects, the duration of the timer may be set to a value that equals or exceeds the MCOT duration. In certain aspects, setting the T2 value to the MCOT duration ensures that the longest COT duration is accounted for and that UE switches to the group of SS sets having a higher frequency of PDCCH occasions only when the COT period expires. Referring to the example of FIG. 3, the T2 timer may be started when the UE switches to monitoring Group B at 314. The value of the timer may be set to expire at the end of the COT period at 318 (or after expiration of MCOT duration). If the UE does not detect or misses an indication from the BS at the end of the COT period at 318 to switch back to Group A, the UE autonomously switches back to Group A after expiration of the T2 timer. In some aspects, the UE may apply this procedure when the COT duration field is not included within the GC-PDCCH or the UE-specific PDCCH triggering switch from Group A to Group B. In some aspects, the UE may apply this procedure when the BS configures the UE with timer T2.

In certain aspects, the UE may detect multiple triggers for switching between groups of SS sets, and at least two of the multiple detected triggers may conflict with each other. For example, the UE may receive within the COT period explicit signaling in GC-PDCCH to switch to slow PDCCH monitoring and may later receive within the same COT period explicit signaling in a UE-specific PDCCH to switch back to fast PDCCH monitoring. In certain aspects, the UE may assign priorities to different triggers for switching between groups of SS sets. In certain aspects, the UE assigns a highest priority to explicit indications received in UE-specific PDCCH, assigns the next lower priority to explicit indications received in GC-PDCCH and assigns the lowest priority to timer based triggers which may be generally used when the UE does detect any explicit indications to switch from the BS. Referring to the above example, the BS may attempt to configure a group of UEs it is serving to switch to slow PCCCH monitoring at the start of the COT period and may indicate that to the UEs using GC-PDCCH. However, the BS may determine to transmit another grant mid-slot to a particular UE from the group and may transmit a UE-specific grant including an indication to switch back to fast monitoring. By configuring a higher priority to the UE-specific PDCCH over GC-PDCCH, the BS ensures that the UE switches back to the faster PDCCH monitoring after received the indication in UE-specific PDCCH. In certain aspects, the trigger priorities may be set by default or configured via RRC signaling.

In alternative aspects, a later detected trigger may be prioritized over a previously detected trigger. In certain aspects, a later indication to switch received in a UE-specific PDCCH may override a previous indication to switch received in a GC-PDCCH. For example, referring to the example of FIG. 3, if a GC-PDCCH received at the start of the COT period indicates the UE to switch to Group B for the COT duration, and before the COT ends, if the UE receives another indication in a UE-specific PDCCH to switch back to Group A, the UE follows the later received indication in UE-specific PDCCH. In certain aspects, a later received GC-PDCCH trigger may be configured/allowed to override an earlier received UE-specific PDCCH trigger (e.g., in the same COT). In certain aspects, a later received GC-PDCCH trigger may not be configured/allowed to override an earlier received UE-specific PDCCH trigger (e.g., in the same COT).

In certain aspects, the UE may assign priority to DL transmissions only until the end of the COT duration. For example, if UE detects a COT acquired by the BS, it may activate the priorities for different DL transmissions, and after the expected end of the COT duration, the UE may deactivate the given priority order. The expected end of COT duration can be determined based on the COT duration field indicated within the GC-PDCCH or the UE-specific PDCCH or can be implicitly determined by the UE by assuming that COT expires after MCOT duration from the instance of COT detection.

In certain aspects, a number of parameters may be defined and configured via RRC signaling. In certain aspects, the UE may configure groups of SS sets for a UE or a group of UEs via RRC signaling. In certain aspects, a default monitoring group may be configured for use during active monitoring periods. Referring to the example of FIG. 3, the UE may monitor Group A by default when operating outside the COT period (e.g., in absence of any explicit trigger to switch to another group). In certain aspects, an RRC parameter may be defined that indicates whether explicit indication to switch between groups of SS sets via GC-PDCCH is enabled or disabled. In certain aspects, another RRC parameter may be defined that indicates whether explicit indication to switch between groups of SS sets via UE-specific PDCCH is enabled or disabled. In certain aspects, a minimum number of symbols may be configured from the UE detecting a switch trigger after which the UE is allowed to switch between groups. In certain aspects, a switching boundary may be configured at which the UE is to switch groups after detecting a switch trigger. In certain aspects, the switching boundary may be a next slot boundary, a next mini-slot boundary, a next subframe boundary, multiple slots/mini-slots/subframes (e.g., a slot/mini-slot/subframe boundary after multiple slots/mini-slots/subframes), a time duration (e.g., in milliseconds). For example, the UE may be configured to switch at the next slot boundary after the minimum configured number of symbols from detecting the trigger. In certain aspects, the minimum number of symbols ensures that the UE has sufficient time to execute the switch even if the next configured switch boundary is before the minimum number of symbols from the switch trigger. In certain aspects, the values of the timers T1 and T2 as discussed above may be configured via RRC signaling.

In certain aspects, the UE may be configured to monitor particular groups of SS sets based on whether the UE is expected to receive traffic and/or how often the UE is expected to receive traffic from the BS. In certain aspects, whether the UE is expected to receive traffic and/or how often the UE is expected to receive traffic may be determined based on one or more Discontinuous Reception (DRX) timers generally used by the UE when in a DRX mode. In certain aspects, when in a DRX mode, the UE generally does not receive any data for long periods of time. Thus it may be beneficial from a power savings standpoint for the UE to monitor at a much slower PDCCH monitoring frequency when in DRX mode until the UE receives a PDCCH grant.

A DRX cycle generally includes a short DRX ON duration (e.g., 2-5 ms) and a relatively longer DRX OFF duration in which the UE maintains a low power state. When the UE is in a DRX mode, the UE wakes up after every DRX cycle period for a duration of the DRX ON period to monitor for pages (e.g., PDCCH grant) from the BS.

In certain aspects, the BS may configure a number of timers for the DRX. These timer may include a short DRX timer, a long DRX timer, an ON duration timer, an inactivity timer, and a re-transmission timer.

In certain aspects, the UE may be configured with a short DRX cycle or a long DRX cycle. The short DRX timer corresponds to the short DRX cycle and the long DRX timer corresponds to the long DRX cycle. Depending on whether the UE is configured with a short or long DRX cycle, a respective short or long DRX timer is triggered after every short or long DRX cycle respectively for the duration of the short or long DRX cycle. A DRX ON duration timer is triggered periodically after every DRX cycle (short or long DRX cycle) and runs for the configured DRX ON duration.

In certain aspects, when the BS desires to send data to the UE, the BS transmits a PDCCH grant to the UE. When the UE detects a PDCCH grant from the BS (e.g., when monitoring PDCCH occasions in a DRX ON duration), the UE triggers the inactivity timer for a configured duration. A running inactivity timer generally indicates that the UE is expected to receive traffic from the BS. In certain aspects, the inactivity timer may be 30 ms or even longer.

As noted above, when in the DRX mode, the UE is not expected to receive traffic from the BS for long periods of time (e.g., may DRX cycles). For example, the UE may not detect a PDCCH grant even after monitoring PDCCH for a number of ON durations. In certain aspects, the UE may be configured to monitor PDCCH in the DRX ON durations (e.g., when DRX ON duration timer is running) with a lower monitoring frequency (e.g., lower than Group B of FIG. 3) to increase power savings. In certain aspects, the UE may be configured to monitor PDCCH in the DRX ON durations with the same monitoring frequency as Group B SS sets.

In certain aspects, the UE is expected to receive more traffic after the detection of initial grant from the BS and when the inactivity timer is running. Thus, the UE may be configured to monitor the channel more frequently when the inactivity timer is running to detect any downlink transmissions from the BS. In certain aspects, the UE may be configured to monitor for PDCCH occasions at a higher frequency when the inactivity timer is running (e.g., higher than the PDCCH monitoring frequency during regular DRX ON durations).

It may be noted that if the UE does not detect a grant while the ON duration timer is running the UE enters a low power state after the expiration of the ON duration timer until the next ON duration timer is triggered.

The retransmission timer is designed for the UE to monitor for retransmissions from the network. The UE generally triggers and runs the retransmission timer for a configured duration when expecting retransmissions from the BS. Thus, in certain aspects, the UE can be expected to receive a retransmission grant when the retransmission is running. Thus, in certain aspects, the UE may be configured to monitor for PDCCH occasions at a higher frequency when the retransmission timer is running (e.g., higher than the PDCCH monitoring frequency during regular DRX ON durations).

Figure 6:
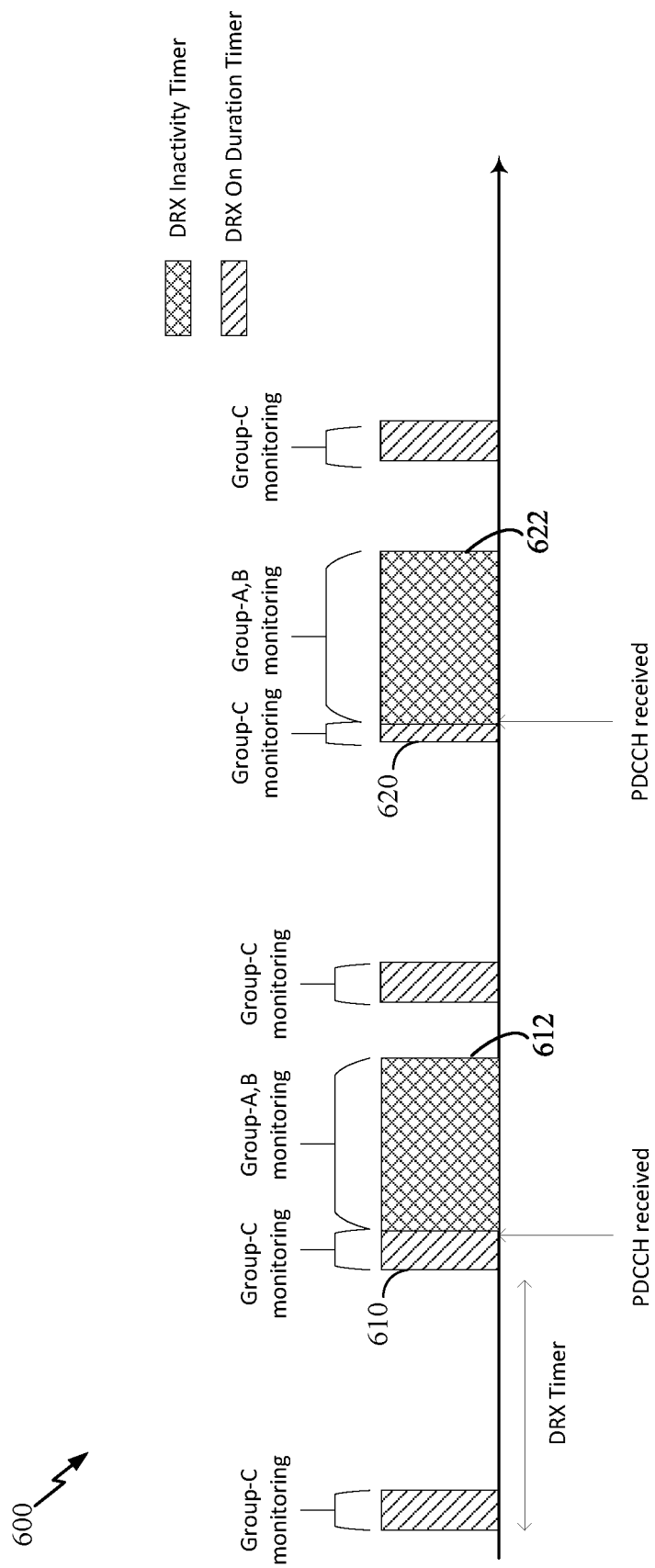
FIG. 6 illustrates an example DRX timeline showing monitoring of search space sets as a function of DRX timers, in accordance with certain aspects of the present disclosure.

FIG. 6 illustrates an example DRX timeline 600 showing monitoring of search space sets as a function of DRX timers, in accordance with certain aspects of the present disclosure.

The example of FIG. 6 assumes that the UE is configured with three groups of search space sets, namely Group A, Group B and Group C. Groups A and B are same as defined with reference to FIG. 3. That is Group A is configured to include two search space sets SS set 1 and SS set 2, while group B is configured to include SS set 2. SS set 2 is common between groups A and B. SS set 1 is configured with a mini-slot level granularity for PDCCH occasions and SS set 2 is configured with a slot level granularity. FIG. 3 and corresponding description may be referred for the structure of each of Group A and Group B SS sets. Group C can be same as Group B, or different from Group B. In certain aspects, Group C includes one or more SS sets which have PDCCH occasion frequencies that are lower than the PDCCH occasion frequency of Group A and/or Group B.

As shown in FIG. 6, each DRX cycle includes a DRX ON duration and a low power duration (or OFF duration). As shown, the UE monitors Group C SS set when the DRX ON duration timer is running. In certain aspects, the UE monitors Group B when the DRX ON duration timer is running.

As shown in FIG. 6, the UE receives a PDCCH grants during ON durations 610 and 620 and in response starts inactivity timers at 612 and 622 respectively. As shown, the UE is configured to monitor Groups A and B when the inactivity timer is running. It may be noted that the techniques for switching between Groups A and B as discussed in aspects of this disclosure apply to monitoring Groups A and B when the inactivity timer is running. For example, the UE may monitor Group A when operating outside the COT and may monitor Group B when operating in the COT period.

In certain aspects, while not shown in FIG. 6, the UE may monitor Groups A and B when the inactivity timer or retransmission timer are running, in accordance with techniques for switching between groups of SS sets as discussed in the present disclosure.

In alternative aspects, the UE may be configured to monitor Group C when at least one of the ON duration timer or the inactivity timer is running, and is configured to monitor Groups A and B as discussed in this disclosure when the retransmission timer is running.

In certain aspects, the UE generally operates according to a long DRX cycle (e.g., 256 ms or longer) and switches to a short DRX cycle (e.g., 64 ms or longer) for a certain time duration when it receives a grant from the network, before switching back to the long DRX cycle. The MAC specification defines a short DRX timer corresponding to the short DRX cycle and a long DRX timer corresponding to the long DRX cycle. The two DRX timers define a time interval between successive DRX ON durations.

Figure 7:
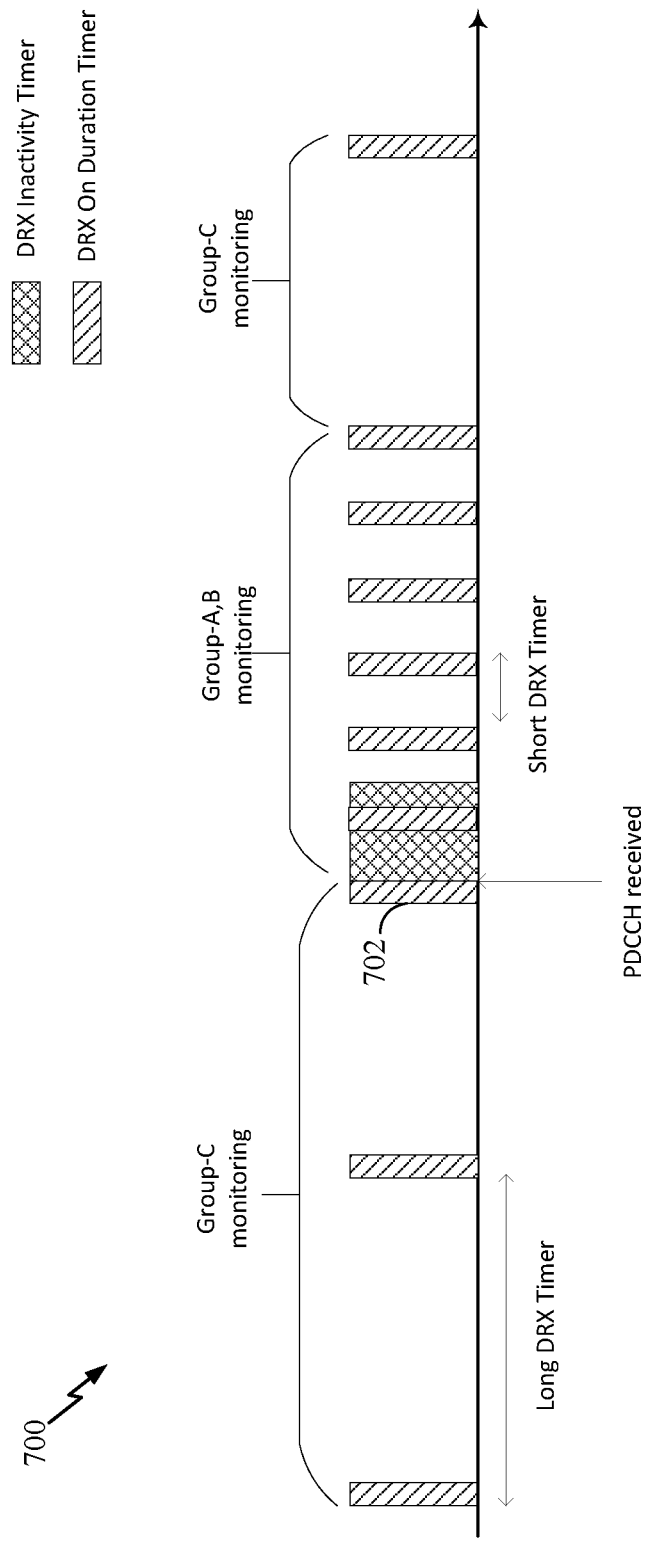
FIG. 7 illustrates an example DRX timeline showing search space monitoring based on short and long DRX cycles, in accordance with certain aspects of the present disclosure.

FIG. 7 illustrates an example DRX timeline showing search space monitoring based on short and long DRX cycles, in accordance with certain aspects of the present disclosure.

As shown in FIG. 7, the UE initially operates according to the long DRX cycle (e.g., by running the long DRX timer). The UE receives a PDCCH grant at ON duration 702 and in response switches to a short DRX cycle by triggering a short DRX timer. Simultaneously, upon receiving the PDCCH grant, the UE starts the inactivity timer as it is expecting more frequent traffic from the BS. As shown, after expiration of the inactivity timer, when the UE does not receive traffic from the network for a number of short DRX cycles, the UE switches back to the long DRX cycles.

In certain aspects, the UE may be configured to monitor Group C when running the long DRX timer and may be configured to monitor groups A and B when running the short DRX timer. For example, the UE may monitor PDCCH occasions according to Group C when the ON duration timer and the long DRX timer are running. That is the UE monitors PDCCH occasions according to Group C during ON durations of the long DRX cycle. The UE may monitor PDCCH occasions according to Group A and Group B when the ON duration timer and the short DRX timer are running. That is the UE monitors PDCCH occasions according to Group A and Group B during ON durations of the short DRX cycle. As discussed with reference with FIG. 6, the UE may be configured to monitor Groups A and B when the inactivity timer or retransmission timer are running.

In certain aspects, the BS may configure the DRX timers during which PDCCH monitoring may be relaxed. For example, RRC configuration may indicate that the UE monitors PDCCH using Group C when DRX ON duration timer and/or DRX inactivity timer is running. During the time when other timers are running, the UE may perform PDCCH monitoring using Groups A and B.

Figure 8:
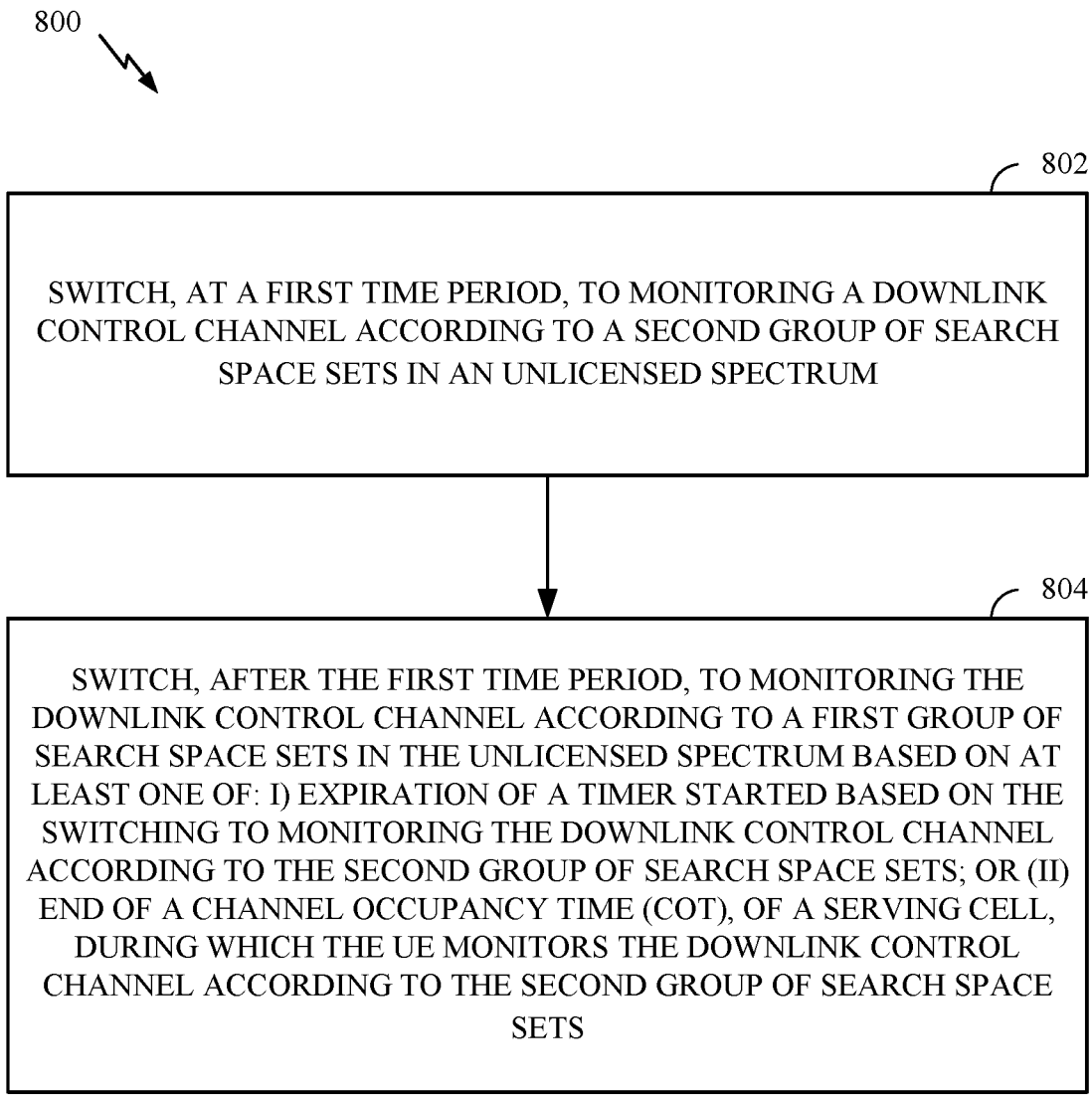
FIG. 8 illustrates example operations performed by a UE for switching between monitoring groups of search space sets, in accordance with certain aspects of the present disclosure.

FIG. 8 illustrates example operations 800 performed by a UE for switching between monitoring groups of search space sets, in accordance with certain aspects of the present disclosure.

Operations 800 begin, at 802, by switching, at a first time period, to monitoring a downlink control channel according to a second group of search space sets in an unlicensed spectrum.

At 804, the UE switches, after the first time period, to monitoring the downlink control channel according to a first group of search space sets in the unlicensed spectrum based on at least one of: i) expiration of a timer started based on the switching to monitoring the downlink control channel according to the second group of search space sets; or (ii) end of a channel occupancy time (COT), of a serving cell, during which the UE monitors the downlink control channel according to the second group of search space sets.

In certain aspects, operations 800 further include receiving an explicit indication identifying the second group of search space sets, wherein switching, at the first time period, to monitoring the downlink control channel according to the second group of search space sets is based on the UE receiving the explicit indication. In certain aspects, the explicit indication comprises one or more bits in a downlink control information (DCI) identifying the second group of search space sets.

In certain aspects, operations 800 further include receiving a transmission from the serving cell, wherein switching, at the first time period, to monitoring the downlink control channel according to the second group of search space sets is based on the UE receiving the transmission from the serving cell.

In certain aspects, switching to monitoring the downlink control channel according to the first group of search space sets is based on expiration of the timer.

In certain aspects, switching to monitoring the downlink control channel according to the first group of search space sets is based on end of the COT.

In certain aspects, operations 800 further include prior to the first time period: receiving an explicit indication identifying the first group of search space sets; and switching to monitoring the downlink control channel according to the first group of search space sets based on receiving the explicit indication. In certain aspects, the explicit indication comprises one or more bits in a downlink control information (DCI) identifying the first group of search space sets.

In certain aspects, operations 800 further include receiving signaling indicating one or more of: configuration of the first group of search space sets; configuration of the second group of search space sets; enabling or disabling of switching between groups of search space sets; a minimum number of symbols after which the UE is allowed to switch between groups after determining to switch; a switching boundary indicating when the UE is to switch between groups after determining to switch; or a value of the timer. In certain aspects, the switching boundary comprises a slot boundary.

In certain aspects, operations 800 further include switching, after the first time period, to monitoring the downlink control channel according to the second group of search space sets in the unlicensed spectrum based on expiration of a second timer started based on the switching to monitoring the downlink control channel according to the first group of search space sets.

In certain aspects, the switching, after the first time period, to monitoring the downlink control channel according to the first group of search space occurs prior to the expiration of the timer based on the UE receiving an explicit indication identifying the first group of search space sets, the explicit indication taking priority over the timer.

In certain aspects, the first group of search space sets comprises a default group of search space sets for monitoring the downlink control channel.

Figure 9:
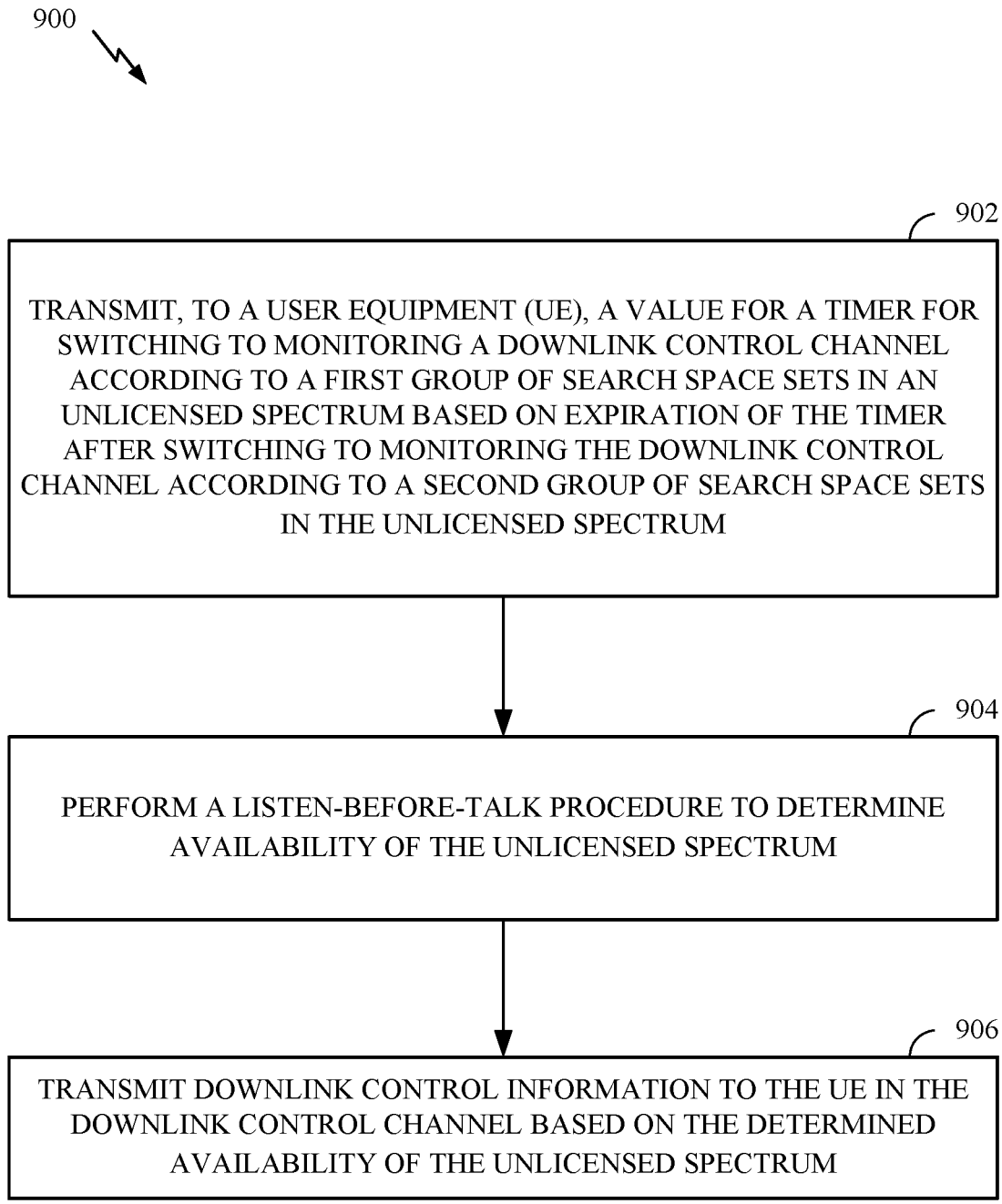
FIG. 9 illustrates example operations performed by a BS (e.g., gNB) for triggering a UE to switch between monitoring groups of search space sets, in accordance with certain aspects of the present disclosure.

FIG. 9 illustrates example operations 900 performed by a BS (e.g., gNB) for triggering a UE to switch between monitoring groups of search space sets, in accordance with certain aspects of the present disclosure.

Operations 900 begin, at 902, by transmitting, to a user equipment (UE), a value for a timer for switching to monitoring a downlink control channel according to a first group of search space sets in an unlicensed spectrum based on expiration of the timer after switching to monitoring the downlink control channel according to a second group of search space sets in the unlicensed spectrum.

At 904, the BS performs a listen-before-talk procedure to determine availability of the unlicensed spectrum.

At 906, the BS transmits downlink control information to the UE in the downlink control channel based on the determined availability of the unlicensed spectrum.

In certain aspects, operations 900 further include transmitting, to the UE, an explicit indication identifying the second group of search space sets for the UE to switch to monitoring the downlink control channel according to the second group of search space sets. In certain aspects, the explicit indication comprises one or more bits in a downlink control information (DCI) identifying the second group of search space sets.

In certain aspects, operations 900 further include transmitting, to the UE, an explicit indication identifying the first group of search space sets for the UE to switch to monitoring the downlink control channel according to the first group of search space sets. In certain aspects, the explicit indication comprises one or more bits in a downlink control information (DCI) identifying the first group of search space sets.

In certain aspects, operations 900 further include transmitting, to the UE, signaling indicating one or more of: configuration of the first group of search space sets; configuration of the second group of search space sets; enabling or disabling of switching between groups of search space sets; a minimum number of symbols after which the UE is allowed to switch between groups after determining to switch; or a switching boundary indicating when the UE is to switch between groups after determining to switch. In certain aspects, the switching boundary comprises a slot boundary.

In certain aspects, operations 900 further include transmitting, to the UE, a value for a second timer for switching to monitoring the downlink control channel according to the second group of search space sets based on expiration of the second timer after switching to monitoring the downlink control channel according to the first group of search space sets.

Example Aspects

Aspect 1: A method of wireless communication by a user equipment (UE), comprising: switching, at a first time period, to monitoring a downlink control channel according to a second group of search space sets in an unlicensed spectrum; and switching, after the first time period, to monitoring the downlink control channel according to a first group of search space sets in the unlicensed spectrum based on at least one of: i) expiration of a timer started based on the switching to monitoring the downlink control channel according to the second group of search space sets; or (ii) end of a channel occupancy time (COT), of a serving cell, during which the UE monitors the downlink control channel according to the second group of search space sets.

Aspect 2: The method of Aspect 1, further comprising receiving an explicit indication identifying the second group of search space sets, wherein switching, at the first time period, to monitoring the downlink control channel according to the second group of search space sets is based on the UE receiving the explicit indication.

Aspect 3: The method of Aspect 2, wherein the explicit indication comprises one or more bits in a downlink control information (DCI) identifying the second group of search space sets.

Aspect 4: The method of Aspect 1, further comprising receiving a transmission from the serving cell, wherein switching, at the first time period, to monitoring the downlink control channel according to the second group of search space sets is based on the UE receiving the transmission from the serving cell.

Aspect 5: The method of any of Aspects 1-4, wherein switching to monitoring the downlink control channel according to the first group of search space sets is based on expiration of the timer.

Aspect 6: The method of any of Aspects 1-4, wherein switching to monitoring the downlink control channel according to the first group of search space sets is based on end of the COT.

Aspect 7: The method of any of Aspects 1-4, further comprising, prior to the first time period: receiving an explicit indication identifying the first group of search space sets; and switching to monitoring the downlink control channel according to the first group of search space sets based on receiving the explicit indication.

Aspect 8: The method of Aspect 7, wherein the explicit indication comprises one or more bits in a downlink control information (DCI) identifying the first group of search space sets.

Aspect 9: The method of any of Aspects 1-8, further comprising receiving signaling indicating one or more of: configuration of the first group of search space sets; configuration of the second group of search space sets; enabling or disabling of switching between groups of search space sets; a minimum number of symbols after which the UE is allowed to switch between groups after determining to switch; a switching boundary indicating when the UE is to switch between groups after determining to switch; or a value of the timer.

Aspect 10: The method of Aspect 9, wherein the switching boundary comprises a slot boundary.

Aspect 11: The method of any of Aspects 1-10, further comprising switching, after the first time period, to monitoring the downlink control channel according to the second group of search space sets in the unlicensed spectrum based on expiration of a second timer started based on the switching to monitoring the downlink control channel according to the first group of search space sets.

Aspect 12: The method of any of Aspects 1-4 or 9-11, wherein the switching, after the first time period, to monitoring the downlink control channel according to the first group of search space sets occurs prior to the expiration of the timer based on the UE receiving an explicit indication identifying the first group of search space sets, the explicit indication taking priority over the timer.

Aspect 13: The method of any of Aspects 1-12, wherein the first group of search space sets comprises a default group of search space sets for monitoring the downlink control channel.

Aspect 14: The method of Aspect 1, A method for wireless communication by a base station (BS), comprising: transmitting, to a user equipment (UE), a value for a timer for switching to monitoring a downlink control channel according to a first group of search space sets in an unlicensed spectrum based on expiration of the timer after switching to monitoring the downlink control channel according to a second group of search space sets in the unlicensed spectrum; performing a listen-before-talk procedure to determine availability of the unlicensed spectrum; and transmitting downlink control information to the UE in the downlink control channel based on the determined availability of the unlicensed spectrum.

Aspect 15: The method of Aspect 14, further comprising transmitting, to the UE, an explicit indication identifying the second group of search space sets for the UE to switch to monitoring the downlink control channel according to the second group of search space sets.

Aspect 16: The method of Aspect 15, wherein the explicit indication comprises one or more bits in a downlink control information (DCI) identifying the second group of search space sets.

Aspect 17: The method of any of Aspects 14-16, further comprising transmitting, to the UE, an explicit indication identifying the first group of search space sets for the UE to switch to monitoring the downlink control channel according to the first group of search space sets.

Aspect 18: The method of Aspect 17, wherein the explicit indication comprises one or more bits in a downlink control information (DCI) identifying the first group of search space sets.

Aspect 19: The method of any of Aspect 14-18, further comprising transmitting, to the UE, signaling indicating one or more of: configuration of the first group of search space sets; configuration of the second group of search space sets; enabling or disabling of switching between groups of search space sets; a minimum number of symbols after which the UE is allowed to switch between groups after determining to switch; or a switching boundary indicating when the UE is to switch between groups after determining to switch.

Aspect 20: The method of Aspect 19, wherein the switching boundary comprises a slot boundary.

Aspect 21: The method of any of Aspects 14-20, further comprising transmitting, to the UE, a value for a second timer for switching to monitoring the downlink control channel according to the second group of search space sets based on expiration of the second timer after switching to monitoring the downlink control channel according to the first group of search space sets.

Aspect 22: An apparatus for wireless communication comprising a memory and at least one processor coupled to the memory, the at least one processor and the memory configured to perform the method of any of Aspects 1-21.

Aspect 23: An apparatus for wireless communication comprising one or more means for performing the method of any of Aspects 1-21.

Aspect 24: A non-transitory computer readable storage medium comprising instructions that when executed by an apparatus for wireless communication cause the apparatus to perform the method of any of Aspects 1-21.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4, 5, 8 and/or 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), the method comprising:
receiving signaling indicating a value of a timer for switching to monitoring according to a default group of search space sets;
switching, at a first time period, to monitoring a downlink control channel according to a non-default group of search space sets in an unlicensed spectrum; and
switching, after the first time period, to monitoring the downlink control channel according to the default group of search space sets in the unlicensed spectrum in response to expiration of the timer started based on the switching to monitoring the downlink control channel according to the non-default group of search space sets, wherein the default group of search space sets is configured for monitoring outside of a channel occupancy time (COT) of a serving cell.

2. The method of claim 1, further comprising receiving an explicit indication identifying the non-default group of search space sets, wherein switching, at the first time period, to monitoring the downlink control channel according to the non-default group of search space sets is based on the UE receiving the explicit indication.

3. The method of claim 2, wherein the explicit indication comprises one or more bits in a downlink control information (DCI) identifying the non-default group of search space sets.

4. The method of claim 1, further comprising receiving a transmission from the serving cell, wherein switching, at the first time period, to monitoring the downlink control channel according to the non-default group of search space sets is based on the UE receiving the transmission from the serving cell.

5. The method of claim 1, further comprising switching to monitoring the downlink control channel according to the default group of search space sets in response to an end of a COT.

6. The method of claim 1, further comprising, prior to the first time period:
receiving an explicit indication identifying the default group of search space sets; and
switching to monitoring the downlink control channel according to the default group of search space sets based on receiving the explicit indication.

7. The method of claim 6, wherein the explicit indication comprises one or more bits in a downlink control information (DCI) identifying the default group of search space sets.

8. The method of claim 1, further comprising receiving signaling indicating one or more of:
a configuration of the default group of search space sets;
a configuration of the non-default group of search space sets;
enabling or disabling of switching between groups of search space sets;
a minimum number of symbols after which the UE is allowed to switch between groups of search space sets after determining to switch; or
a switching boundary indicating when the UE is to switch between groups after determining to switch.

9. The method of claim 8, wherein the switching boundary comprises a slot boundary.

10. The method of claim 1, further comprising switching, after the first time period, to monitoring the downlink control channel according to the non-default group of search space sets in the unlicensed spectrum based on expiration of a second timer started based on the switching to monitoring the downlink control channel according to the default group of search space sets.

11. The method of claim 1, further comprising switching to monitoring the downlink control channel according to the default group of search space prior to expiration of the timer in response to the UE receiving an explicit indication identifying the default group of search space sets, the explicit indication taking priority over the timer.

12. The method claim 1, further comprising receiving downlink control information (DCI), wherein the switching to monitoring the downlink control channel according to the default group of search space sets is in response to the expiration of the timer when the DCI does not carry a COT duration field, and wherein the switching to monitoring the downlink control channel according to the default group of search space sets is in response to the end of the COT when the DCI carries the COT duration field.

13. A method for wireless communication by a base station (BS), the method comprising:
transmitting, to a user equipment (UE), a first value for a first timer for switching to monitoring a downlink control channel according to a default group of search space sets in an unlicensed spectrum in response to expiration of the first timer started based on switching to monitoring the downlink control channel according to a non-default group of search space sets in the unlicensed spectrum, wherein the default group of search space sets is configured for monitoring outside of a channel occupancy time (COT) of a serving cell;
performing a listen-before-talk procedure to determine availability of the unlicensed spectrum; and
transmitting downlink control information to the UE in the downlink control channel based on the determined availability of the unlicensed spectrum.

14. The method of claim 13, further comprising transmitting, to the UE, an explicit indication identifying the non-default group of search space sets for the UE to switch to monitoring the downlink control channel according to the non-default group of search space sets.

15. The method of claim 14, wherein the explicit indication comprises one or more bits in a downlink control information (DCI) identifying the non-default group of search space sets.

16. The method of claim 13, further comprising transmitting, to the UE, an explicit indication identifying the default group of search space sets for the UE to switch to monitoring the downlink control channel according to the default group of search space sets.

17. The method of claim 16, wherein the explicit indication comprises one or more bits in a downlink control information (DCI) identifying the default group of search space sets.

18. The method of claim 13, further comprising transmitting, to the UE, signaling indicating one or more of:
configuration of the default group of search space sets;
configuration of the non-default group of search space sets;

enabling or disabling of switching between groups of search space sets;

a minimum number of symbols after which the UE is allowed to switch between groups of search space sets after determining to switch; or a switching boundary indicating when the UE is to switch between groups after determining to switch.

19. The method of claim 18, wherein the switching boundary comprises a slot boundary.

20. The method of claim 13, further comprising transmitting, to the UE, a second value for a second timer for switching to monitoring the downlink control channel according to the non-default group of search space sets in response to expiration of the second timer started based on switching to monitoring the downlink control channel according to the default group of search space sets.

21. An apparatus for wireless communication by a user equipment (UE), the apparatus comprising:
a memory comprising computer executable code stored thereon; and
at least one processor coupled to the memory, the at least one processor configured to execute the computer executable code and cause the apparatus to:
receive signaling indicating a value of a timer for switching to monitoring according to a default group of search space sets;
switch, at a first time period, to monitoring a downlink control channel according to a non-default group of search space sets in an unlicensed spectrum; and
switch, after the first time period, to monitoring the downlink control channel according to the default group of search space sets in the unlicensed spectrum in response to expiration of the timer started based on the switching to monitoring the downlink control channel according to the non-default group of search space sets, wherein the default group of search space sets is configured for monitoring outside of a channel occupancy time (COT) of a serving cell.

22. The apparatus of claim 21, wherein the at least one processor is further configured to cause the apparatus to receive an explicit indication identifying the non-default group of search space sets, wherein switching, at the first time period, to monitoring the downlink control channel according to the non-default group of search space sets is based on the UE receiving the explicit indication.

23. The apparatus of claim 21, wherein the at least one processor is further configured to cause the apparatus to receive a transmission from the serving cell, wherein switching, at the first time period, to monitoring the downlink control channel according to the non-default group of search space sets is based on the UE receiving the transmission from the serving cell.

24. The apparatus of claim 21, wherein the at least one processor is further configured to cause the apparatus to, prior to the first time period:
receive an explicit indication identifying the default group of search space sets; and
switch to monitoring the downlink control channel according to the default group of search space sets based on receiving the explicit indication.

25. The apparatus of claim 21, wherein the at least one processor is further configured to cause the apparatus to receive signaling indicating one or more of:
configuration of the default group of search space sets;
configuration of the non-default group of search space sets;
enabling or disabling of switching between groups of search space sets;
a minimum number of symbols after which the UE is allowed to switch between groups of search space sets after determining to switch; or
a switching boundary indicating when the UE is to switch between groups of search space sets after determining to switch.

26. The apparatus claim 21, wherein the at least one processor is further configured to cause the apparatus to receive downlink control information (DCI), wherein the switching to monitoring the downlink control channel according to the default group of search space sets is in response to the expiration of the timer when the DCI does not carry a COT duration field, and wherein the switching to monitoring the downlink control channel according to the default group of search space sets is in response to the end of the COT when the DCI carries the COT duration field.

27. An apparatus for wireless communication by a base station (BS), the apparatus comprising:
a memory comprising computer executable code stored thereon; and
at least one processor coupled to the memory, the at least one processor configured to execute the computer executable code and cause the apparatus to:
transmit, to a user equipment (UE), a value for a timer for switching to monitoring a downlink control channel according to a default group of search space sets in an unlicensed spectrum in response to expiration of the timer after switching to monitoring the downlink control channel according to a non-default group of search space sets in the unlicensed spectrum, wherein the default group of search space sets is configured for monitoring outside of a channel occupancy time (COT) of a serving cell;
perform a listen-before-talk procedure to determine availability of the unlicensed spectrum; and
transmit downlink control information to the UE in the downlink control channel based on the determined availability of the unlicensed spectrum.

28. The apparatus of claim 27, wherein the at least one processor is further configured to cause the apparatus to transmit, to the UE, an explicit indication identifying the non-default group of search space sets for the UE to switch to monitoring the downlink control channel according to the non-default group of search space sets.

29. The apparatus of claim 27, wherein the at least one processor is further configured to cause the apparatus to transmit, to the UE, an explicit indication identifying the default group of search space sets for the UE to switch to monitoring the downlink control channel according to the default group of search space sets.

30. The apparatus of claim 27, wherein the at least one processor is further configured to cause the apparatus to transmit, to the UE, signaling indicating one or more of:
configuration of the default group of search space sets;
configuration of the non-default group of search space sets;
enabling or disabling of switching between groups of search space sets;
a minimum number of symbols after which the UE is allowed to switch between groups of search space sets after determining to switch; or
a switching boundary indicating when the UE is to switch between groups of search space sets after determining to switch.

* * * * *